(12) United States Patent
de Araujo Lima et al.

(10) Patent No.: US 11,836,299 B1
(45) Date of Patent: Dec. 5, 2023

(54) VIRTUAL SIGN LANGUAGE SYSTEM

(71) Applicant: Lenovo (Singapore) Pte. Ltd., Singapore (SG)

(72) Inventors: Joao Víctor de Araujo Lima, São Carlos (BR); Jonatan Lemes, Camanducaia (BR); Alexandre de Faustino Miranda, São Paulo (BR); Jampierre Vieira Rocha, Itambacuri (BR)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/959,745

(22) Filed: Oct. 4, 2022

(51) Int. Cl.
*G06F 3/02* (2006.01)
*G06F 3/04817* (2022.01)

(52) U.S. Cl.
CPC ........ *G06F 3/0219* (2013.01); *G06F 3/04817* (2013.01)

(58) Field of Classification Search
CPC .................. G06F 3/0219; G06F 3/04817
See application file for complete search history.

(56) References Cited

U.S. PATENT DOCUMENTS

| | | | |
|---|---|---|---|
| 6,377,925 B1 * | 4/2002 | Greene, Jr. | G10L 21/06 704/235 |
| 2011/0285635 A1 * | 11/2011 | Ohki | H03M 11/08 345/171 |

* cited by examiner

*Primary Examiner* — Mark Edwards
(74) *Attorney, Agent, or Firm* — Ference & Associates LLC

(57) ABSTRACT

One embodiment provides a method, the method including: receiving, at an information handling device utilizing a virtual sign language system, sign language element inputs from a user provided on a virtual keyboard; determining, utilizing the virtual sign language system, a set of sign language element search results resulting from the sign language element inputs; receiving, from the user at the virtual keyboard, input selecting one search result from the set of search results; and providing, utilizing the virtual sign language system, an output corresponding to the selected one search result. Other aspects are claimed and described.

20 Claims, 4 Drawing Sheets

VIRTUAL SIGN LANGUAGE SYSTEM

BACKGROUND

Sign language is a communication method that is commonly utilized by individuals that have issues communicating using traditional audible methods. People that are deaf may make up the majority of the individuals that communicate using sign language. Other people, such as mutes, can also use this language to communicate. The inability to hear an oral language or speak results in a reliance on communicating via hand gestures. Sign languages generally have their grammar and lexicon that may not match the oral languages.

BRIEF SUMMARY

In summary, one aspect provides a method, the method including: receiving, at an information handling device utilizing a virtual sign language system, sign language element inputs from a user provided on a virtual keyboard; determining, utilizing the virtual sign language system, a set of sign language element search results resulting from the sign language element inputs; receiving, from the user at the virtual keyboard, input selecting one search result from the set of search results; and providing, utilizing the virtual sign language system, an output corresponding to the selected one search result.

Another aspect provides a system, the system including: a virtual keyboard; a processor operatively coupled to the virtual keyboard; a memory device that stores instructions that, when executed by the processor, causes the system to: receive, utilizing a virtual sign language system, sign language element inputs from a user provided on the virtual keyboard; determine, utilizing the virtual sign language system, a set of sign language element search results resulting from the sign language element inputs; receive, from the user at the virtual keyboard, input selecting one search result from the set of search results; and provide, utilizing the virtual sign language system, an output corresponding to the selected one search result.

A further aspect provides a product, the product including: a computer-readable storage device that stores executable code that, when executed by a processor, causes the product to: receive, utilizing a virtual sign language system, sign language element inputs from a user provided on a virtual keyboard; determine, utilizing the virtual sign language system, a set of sign language element search results resulting from the sign language element inputs; receive, from the user at the virtual keyboard, input selecting one search result from the set of search results; and provide, utilizing the virtual sign language system, an output corresponding to the selected one search result.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
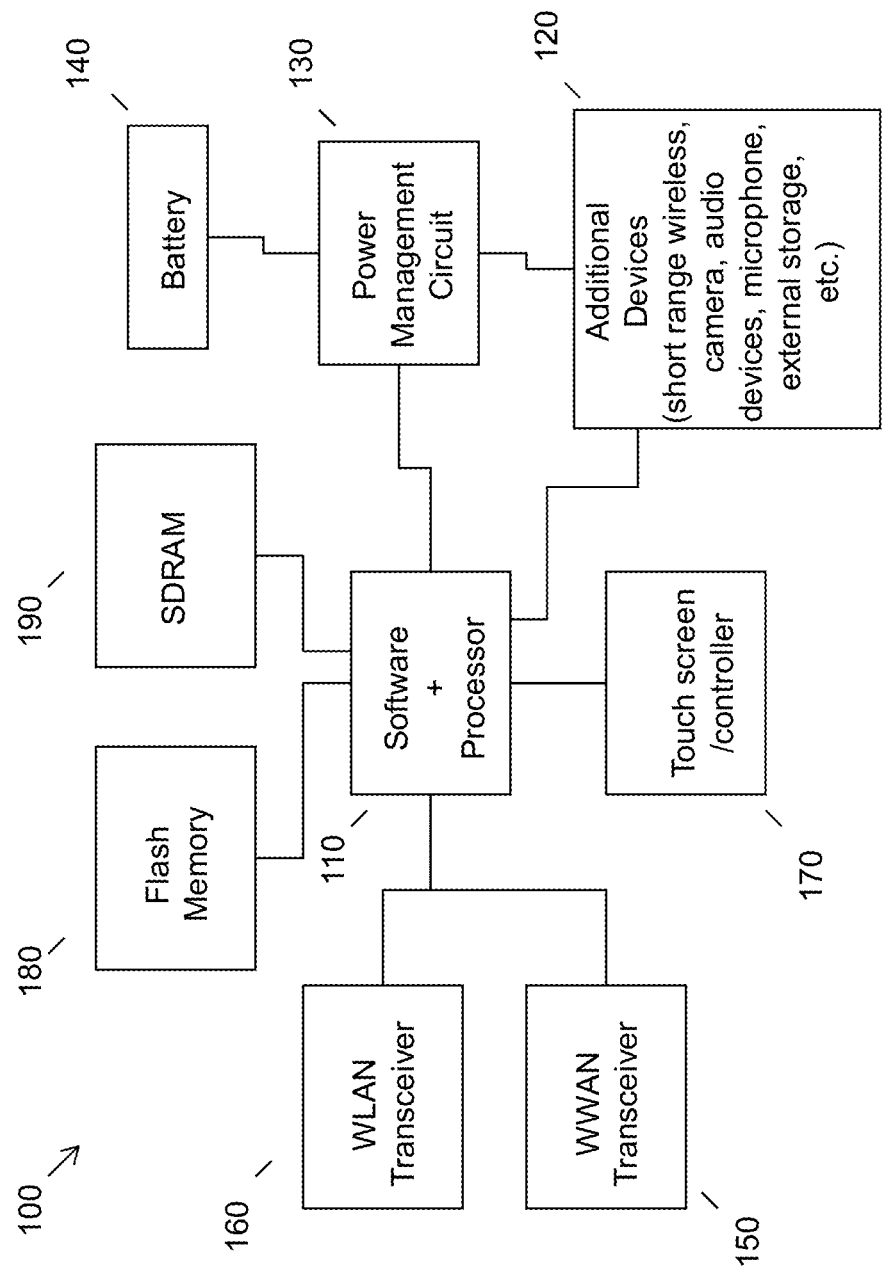
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Those who rely on the use of sign language commonly have an issue utilizing traditional, oral communication methods. Whether a user is deaf, mute, and or the like, sign language permits those with oral communication issues to communicate via hand gestures. For those that lose an ability to communicate via oral communication methods, for example, a person who at one time can hear and gradually loses their ability to hear over time, some formal oral language training may have been learned by the user. Formal oral language training refers to learning a reading and /or writing method associated with an oral communication style. In other words, formal language training includes learning how to speak, and further, how to read and write in an oral language. A user's ability to phonetically break down a words based upon pronunciation and the use of the letters of language that form an alphabet is typically the result of mastering the oral language utilizing an oral communication method. For those who do not suffer from an oral communication issue, learning the phonetics of a language can also be the baseline of communicating using spoken-word and/or written communication methods. More specifically, the formal oral language training allows a user to learn to read and write an oral language in a manner that matches the correct rules and techniques of the oral language.

However, for the individuals that may have been born with the inability to hear an oral language may become reliant on sign language as their primary communication method for an extended period of time. Since sign language has its own grammar and lexicon, it may not match the language that it is intended to complement. Additionally, receiving formal oral language training is uncommon. A user's inability to orally communicate makes learning the phonetics of an oral language difficult. Additionally, or alternatively, learning sign language requires time and dedication, therefore, attempting to undergo formal oral language training while also undergoing sign language training may be difficult for an individual. As a result, formal oral language training is commonly not taught to individuals with oral communication issues, and these individuals may have difficulty in breaking down and communicating via written-word methods that are intended to match the oral languages.

A lack of methods attempting to overcome an individual's inability to communicate in oral languages, outside of undergoing formal language training, provides individuals with such oral communication issues with little-to-no ability to communicate over a written modality intended to match an oral language. Since phonetics of a language are difficult to learn by an individual with an oral communication issue, learning a written modality of an oral language, in many countries, is commonly not taught to they. Thus, what is needed is a system and method that may translate sign language input, and/or the parameters surrounding a sign language input, into a written modality for a user that may have an oral communication issue.

Accordingly, the described system and method provides a technique for receiving sign language input and thereafter providing output corresponding to the sign language input received by use of a virtual sign language system. The virtual sign language system is employed on an information handling device, and may receive virtual sign language element inputs from a user on a virtual keyboard. Sign language element inputs include inputs identifying parameters and phonological restrictions of a sign used in sign languages. Rather than the system attempting to receive signs communicated by use of sign language, the system may receive inputs identifying parameters and phonological restrictions of a desired sign at the virtual keyboard of the virtual sign language system. By receiving the inputs on a keyboard instead of the signs, the system does not have to employ video processing in order to identify the signs the user is providing. Additionally, signs can at least be initially divided into different parameters and phonological restrictions, for example, hand shape, location of the provided sign, hand(s) the sign is provided with, and whether the sign includes a movement. By utilizing the parameters and phonological restrictions, the keyboard can be divided into a set of input areas that allow the ability to find almost all signs instead of requiring a keyboard that includes all possible signs, which, if even possible, would be an extremely complicated keyboard.

Subsequent to receiving the sign language element inputs, the virtual sign language system may be tasked with determining a set of sign language element search results from the received sign language element inputs. The sign language element inputs may be inputted with a desired sign in mind; however, the plurality of signs present in sign language may contain at least two signs that are different, but fall within the same parameters and phonological restrictions as the sign language element inputs received. Since the possibility of a plurality of signs being produced by the sign language element inputs is present, the user may then provide an input selecting a search result from the set of the search results determined. This selection by the user of the desired sign may then produce on output correspond to the selection and provide the output to an application working in combination and/or inline with an application present on the information handling device. In the system, the output provided may include a video of the selected one search result. In the system, the output provided may include a textual form of the selected one search result.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (12C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
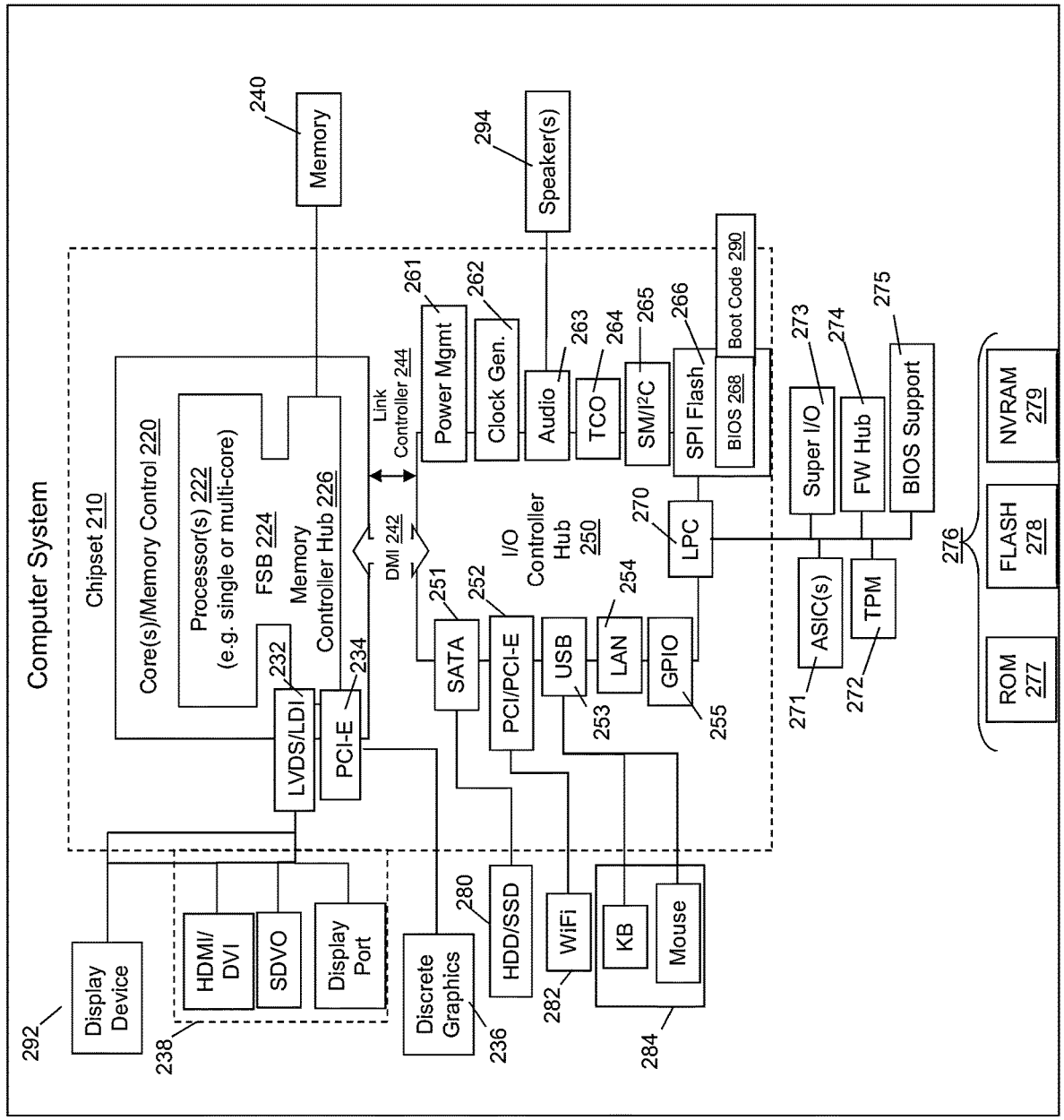
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in a system that receives sign language element inputs from a user and thereafter provides an output corresponding to a selected search result based upon the received sign language element inputs. For example, the circuitry outlined in FIG. 1 may be implemented in a tablet or smart phone embodiment, whereas the circuitry outlined in FIG. 2 may be implemented in a personal computer embodiment.

Figure 3:
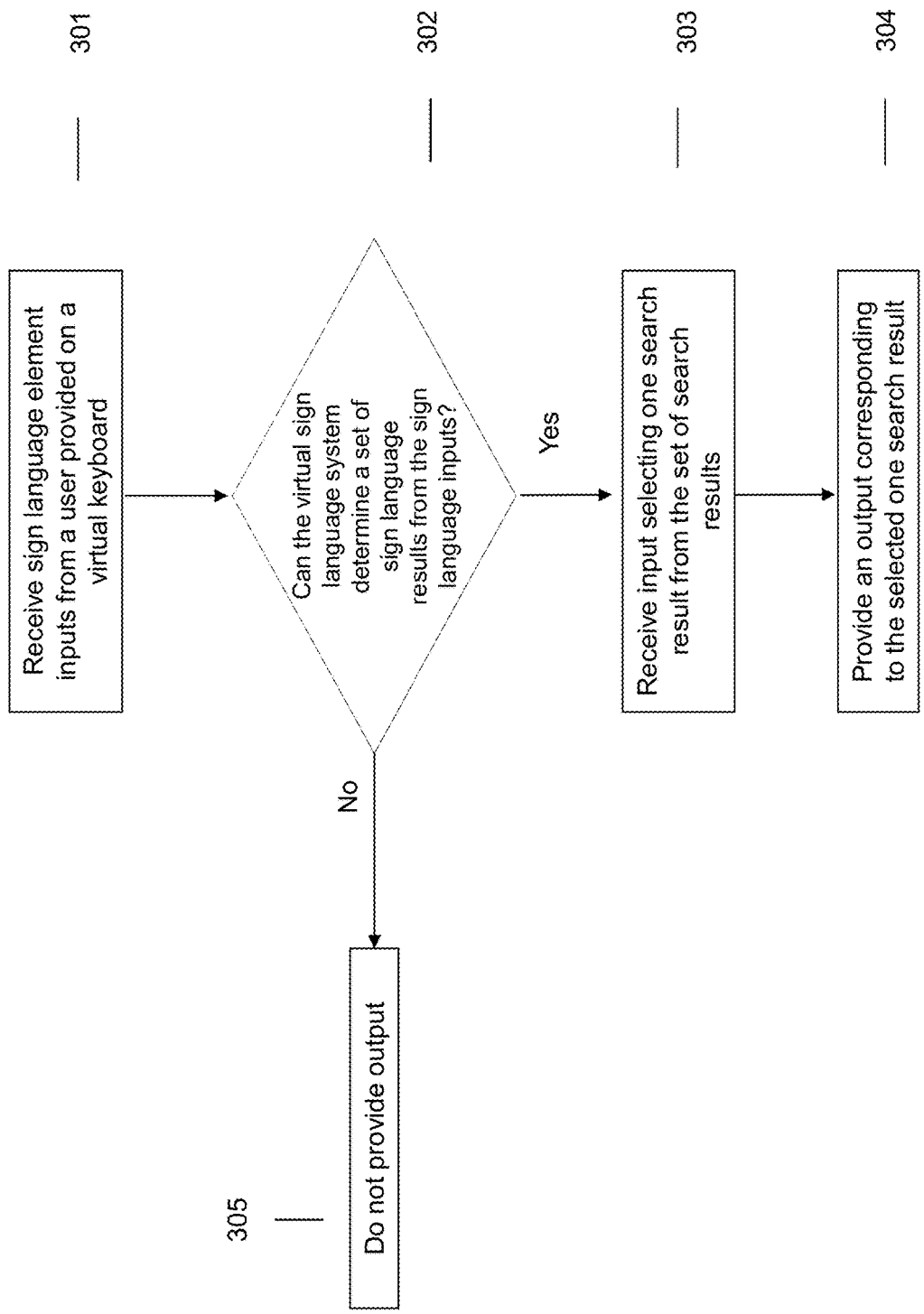
FIG. 3 illustrates an example method for providing output corresponding to sign language element inputs provided by a user on a virtual keyboard of a virtual sign language system.

FIG. 3 illustrates an example method for determining a set of results from received sign language element inputs, and thereafter providing an output selected from the set of results by use of a virtual sign language system. The method may be implemented on a system which includes a processor, memory device, output devices (e.g., display device, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the virtual sign language system itself is specifically programmed to perform the functions as described herein to provide an output corresponding to the selected at least one search result produced by the virtual sign language system from the received sign language element input from the user.

The virtual sign language system may run in the background of an information handling device and may be activated when the device is activated. Additionally, or alternatively, the system may be activated when an application associated with a sign language communication method (e.g., text messaging platform, word processing program, multimedia processing program, etc.) is activated, detected, or otherwise opened. The system may also activate the system upon the receiving of sign language element inputs at a virtual keyboard. In this case, the virtual sign language system may not be activated until at least one sign language element input has been received at an information handling device associated with a user.

Once the virtual sign language system is activated on a device, the system may be utilized throughout the process of receiving sign language element inputs from a user provided on a virtual keyboard, determining a set of sign language element search results resulting from the sign language element inputs, receiving input selection selecting one search result from the set of search results at the virtual keyboard, and providing an output corresponding to the selected one search result. Continued use of the virtual sign language system receiving sign language element inputs and determining a set of sign language element search results will train the device in producing an accurate result set so that the user may then select a desired one search result from the set of search results. In other words, the system may learn selections from the user and use these to more accurately identify or provide search results to the user. In other words, based upon previously selected search results, the system may weight or prioritize different possible search results, thereby presenting more likely selections first or in a higher position as compared to less likely selections.

To perform the steps present in the virtual sign language system and in order to accurately determine a set of sign language element search results from the sign language element inputs, the virtual sign language system may utilize a neural network, machine-learning model, and/or other learning algorithm, collectively referred to as a machine-learning model for ease of readability. The machine-learning model can be trained utilizing previously supplied sign language element inputs, and previously produced sets of sign language search results. In other words, the machine-learning model is given access to previously received sign language element inputs and produced sets of search results from specific sign language element inputs. Additionally, the machine-learning model receives previously selected search results from the set of search results and, thereafter, the output associated and selected by the user to further train the machine-learning model. These established sign language elements, search result sets, user search result selection, and output of the selected search result are referred to as a training dataset.

Using the training dataset, which may change over time, the machine-learning model learns nuances between received sign language element inputs, the search results presented, and the selections by the user. This results in more accurately identifying a desired search result for the user and the outputting of the selected search result. For example, the machine-learning model can learn when a user may elect to output a selected search result as a video and/or when a user may elect to output a selected search result in a textual form. As an additional example, the system can learn the sign language results that a user selects from parameters and phonological restrictions provided by the user. As information is determined within a set of sign language search results from the received sign language element inputs, the machine-learning model can learn additional nuances and become more accurate and refined over time. Thus, while there is an initial training dataset that is used to initially train the machine-learning model, the machine-learning model is learning over time based upon new information received by the machine-learning model, thereby evolving to become more accurate.

At 301, while an information handling device with the virtual sign language system is in use, the system may receive sign language element inputs from user. Sign language elements are also referred to as "signs" and sign language element inputs are those inputs from a user that describe or identify the parameters or other features of the sign in picture form. The virtual sign language system may utilize a virtual keyboard to receive such sign language element inputs from the user. This virtual keyboard may be designed to include sections or input areas corresponding to a specific parameter and phonological restrictions of the received sign language input. As mentioned previously, receipt of sign language element inputs is not collected from a user performing a sign, but rather a user may provide a sign language element input at the virtual keyboard identifying a parameter and/or a phonological restriction of a desired sign to be selected later. In other words, the user does not perform the sign, but rather selects the parameters and the phonological restrictions of the desired sign from the virtual keyboard.

In the system, the sign language element inputs provided by the user on a virtual keyboard of the virtual sign language system may correlate to a specific parameter and phonological restrictions of a desired sign. An example parameter may include a hand shape. The hand shape sign language input parameter may identify how a hand or hands of signer may be orientated and/or formed when starting and/or performing a sign. In the system, the initial hand shape of the user may be recorded. The term hand shape may also extend to body shape as some sign language signs may use other parts of the body to express the sign, for example, arms of the user, head of the user, torso of the user, and/or the like. Thus, while the term hand shape is used, it should be understood that this means not only the shape and/or orientation of the hand, but the shape and/or orientation of the user's body, as applicable for a particular sign.

Figure 4:
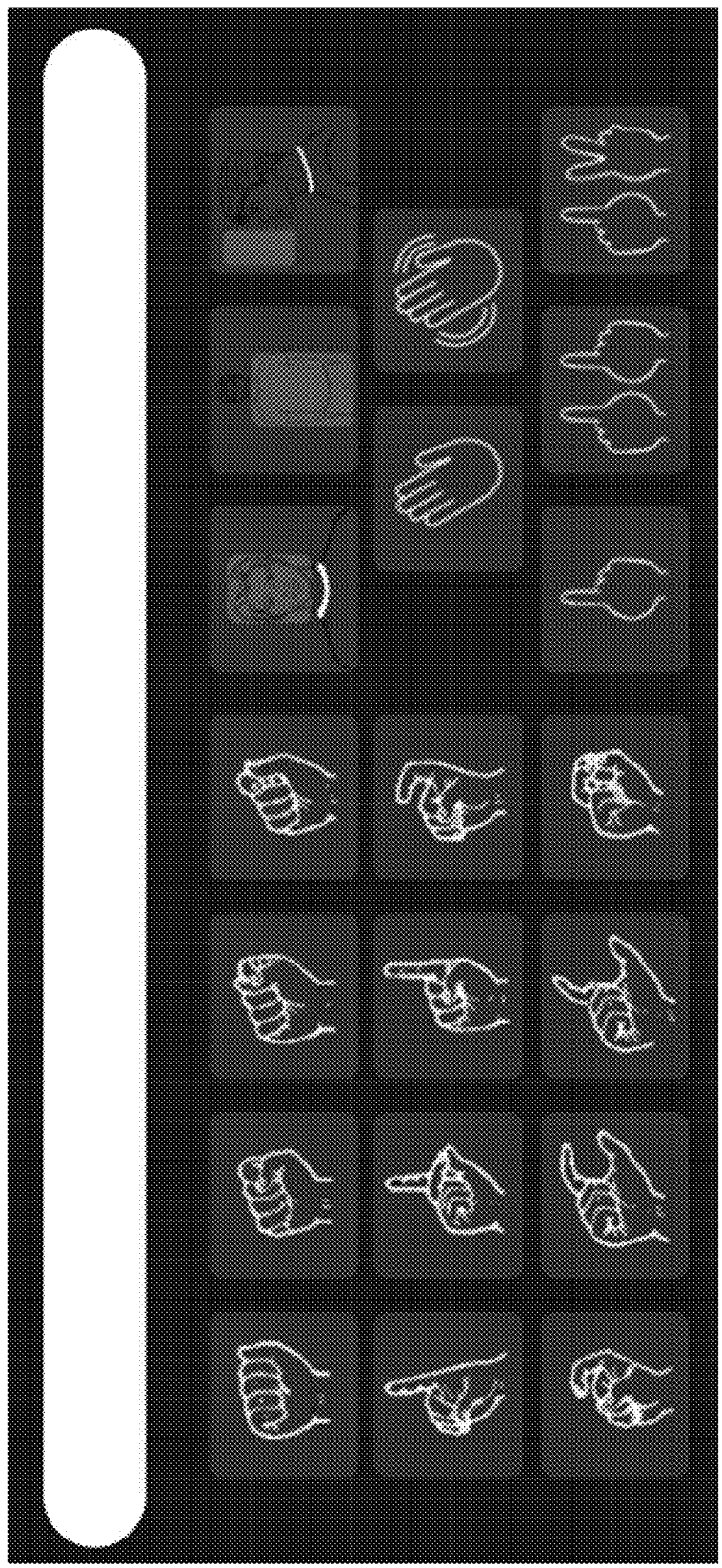
FIG. 4 illustrates a virtual keyboard of the virtual sign language system.

As can be seen in FIG. 4, an example virtual keyboard is provided, and the left half of the virtual keyboard is associated with the hand shape. In FIG. 4, there are three (3) rows of hand shape types. The hand shape sign language input may be selected from an abbreviated selection of hand shapes. The abbreviated selection of hand shapes may be determined based upon the most common hand shapes in the sign language-type. The abbreviated selection of hand shapes may also be based upon those most commonly selected by the user, set by a user, and/or the like. Additionally, or alternatively, in the system, a user may elect to extend the hand shape selection options to all hand shape options, and then provide the sign language element input. For example, the user may select-and-hold a hand shape similar to a desired hand shape, and upon detection of the holding of a hand shape selection on the virtual keyboard, the virtual sign language system may provide additional, similar hand shapes that are not originally presented on the virtual keyboard. The virtual sign language system may provide a list of all hand shapes upon selection of, for example, an additional option for displaying all hand shapes present in a sign language. On the virtual keyboard of the virtual sign language system, the hand shape of a user performing a sign may identify a parameter of a desired sign of a user.

Another example parameter and, therefore, sign language element input, is the location of a sign with respect to the human body. In other words, the location identifies where on the body the sign is performed. When performing a sign, the location of where a sign is performed in relation to the human body may change a meaning of a sign. For example, performing a sign with the same parameters as another sign but at different body locations may result in different sign meanings. Referring back to FIG. 4, the location of the sign language element include, for example, the last three (3) selection areas along the top row of the virtual keyboard. As can be seen in FIG. 4, and used as an example, the parameters displayed on the virtual keyboard include the "head" location, "body" location, and "neutral space" location, as seen from left to right. The highlighted portion of the body within the selectable area may illustrate the parameter selection input.

Additionally, or alternatively, performing a sign on a location of the body may be more specific or different than the three locations originally provided on the virtual keyboard. Similar to the expansion of options discussed previously for the hand shape parameters, a user may select-and-hold one of the location options, which may then provide more specific locations for selection. As an example, the user may select the location that most closely relates to the desired sign element, and upon selecting and holding the selected location on the virtual keyboard, the virtual sign language system may provide more specific options related to the location for performing a sign. For example, in the system, after selecting the "body" parameter option and holding the option down, the virtual keyboard may supply a user with specific body regions to identify the location of the desired sign language element, for example, shoulders, breastplate, abdomen, and/or the like.

Another example parameter and, therefore, sign language input element, is a movement performed for the sign. In other words, the user may select if the hand(s) of a user move when performing a sign or if the hand(s) remain stationary. As noted previously, this may also apply to other body parts that may move during the performance of a sign. When a user selects the option that a hand(s) of the user remain stationary, or do not move, for example, when spelling and/or providing a single letter at a time, the virtual keyboard may accept the selection with no further input regarding the movement. Additionally, or alternatively, similar to the expansion of parameter options as previously described, the system may accept an input identifying the sign includes movement, and may, accordingly, provide a user with the option to select a more specific movement pattern. These additional options may be provided utilizing a select-and-hold technique while on the movement input selection of the virtual keyboard. Alternatively, or additionally, upon a simple selection of the movement option (e.g., single input press, tap, etc.), the virtual keyboard may provide a pop-up display with the additional options, may change the virtual keyboard to display movement options, and/or the like. In FIG. 4, for example, the last two selection options present along the middle row identify an initial movement-type, no movement or movement.

Another sign language element input and, therefore, phonological restriction of a sign language element includes a handed-type. The handed-type phonological restriction of a sign language input may identify if one or two hands will be used when performing the sign. In the event that other body parts are used during the performance of a sign, the virtual keyboard may include such body parts or the user may provide input to expand the handed-type phonological restriction selections to include other body parts. The handed-type phonological restriction not only identifies if one or two hands are utilized, but also identifies input options identifying if the two hands will be moving with the same parameters, in other words, moving in parallel while performing the same movement and other parameters, or if the two hands will be moving with different parameters.

Referring to FIG. 4, the virtual keyboard may include three (3) sign language input options describing the options for the handed-type. This may be observed by the last three (3) input options along the bottom row of the virtual keyboard. When selecting the single hand input, the virtual sign language system may apply the selected parameters to the dominant hand of the user. Though the handed-type options include two separated, two-handed options, simply selecting whether the sign language option will be within the same parameters or within different parameters may provide enough information for the virtual sign language system to provide an accurate set of sign language element search results, as is determined at 302.

After receiving the sign language input options, the system, at 302, may determine if the virtual sign language system can determine a set of sign language results from the sign language element inputs received. The sign language input options may be utilized as search query parameters that are applied to all the possible sign language elements. The result of this search query is the set of sign language results. The system may additionally, or alternatively, utilize a machine-learning model to produce a set of sign language element search results that correlate to the received sign language inputs. Identifying the parameters and the phonological restrictions of a sign language element may provide enough information for the virtual sign language system to retrieve, from an accessible database and/or storage location, sign language elements with, and/or closely related to, the inputted parameters and phonological restriction.

Upon determining that at least one sign language element search result is present based upon the provided parameters and phonological restrictions at the virtual keyboard, the virtual sign language system may provide the set of search results. One technique for providing the set of search results includes providing video on the virtual keyboard displaying signs having the provided parameters and phonological restrictions. A video for each sign language element present in a set of search results may be provided to the user. Another technique may include providing a set of images for stationary signs and/or series of image steps for each result in the event that the sign includes movement. Referring to FIG. 4, for example, the large open bar along the top of the virtual keyboard may be where the set of sign language element search results are provided back to the user. In the system, when it is determined, at 302, that at least one sign language element cannot be produced based upon the received sign language element inputs from the user, the system may not provide an output of the sign language element, as shown at 302.

However, when it is determined, at 302, that the virtual sign language system can produce a set of sign language element search results from the sign language element inputs and the results are provided to the user, the system may then receive input from the user selecting one search result from the set of search results, at 303. In the system, receiving input, or a user selecting, at 303, one search result from the set of search results requires a user to make a decision associated with the desired sign language elements provided back from the virtual sign language system. The input may include, for example, clicking the desired sign language element, highlighting the desired sign language element, holding the desired sign language element, and/or the like. In the event that the set of search results includes more results than fit on the virtual keyboard, the user may provide input indicating the results should be expanded, changed to different options, and/or the like. The user may also be able to provide input indicating that a result is close, but not the correct one, for example, by providing a "more-like-this" input to the result that is close. This may result in an additional search utilizing the selected close result as the query input.

Upon receiving the input selecting the search result from the set of search results, the system may provide an output, at 304, corresponding to the selected search result. Providing the output may include providing a video of the selected search result. The virtual sign language system may incorporate the inclusion of the video performing the sign language element in an application that may support such context. For example, the system may provide video output through a direct message across a social media platform in the similar method that an application provides gifs. Additionally, or alternatively, for example, the system may permit sending a video requiring an action to imitate the performing of the video containing the sign language element, similar to a clipped and/or uploaded video to a video viewing platform.

Providing an output, at 304, may include providing the selected search result in a textual form. The virtual sign language system may translate the selected one search result into text form to be implemented into a text-based system. As mentioned previously, people who lack an ability to communicate orally and/or never receive formal oral language training (e.g., writing, reading, etc.), may not be able to communicate using traditional text-communication methods that correspond to the oral language. The system's ability to translate a video produced from the received sign language element inputs provided by the user to a textual form provides an opportunity to such a user to communicate in a more traditional manner.

In this manner, the user can provide inputs to select sign language input elements. As one can imagine, the user can provide a series of inputs that result in a series of search results. As the user selects the series of search results, the system may, when providing the output, apply the oral language rules selected on the output. For example, if a user wants to provide a sentence using a selection in sign language elements, once all the sign language elements for the sentence are selected, the system can apply oral grammar, syntax, lexicon, and/or other rules to the translated output, thereby generating an oral language rule-correct video or text-based output. Thus, the described system allows the user to communicate in a rule-correct way for the oral language without the formal oral language training that would normally be required and also allows the user a comfortable way for providing the input to be converted.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
receiving, at an information handling device utilizing a virtual sign language system, sign language element inputs from a user provided on a virtual keyboard, wherein the receiving comprises updating the virtual keyboard based upon the sign language elements inputs received from the user;
determining, utilizing the virtual sign language system, a set of sign language element search results resulting from the sign language element inputs;
receiving, from the user at the virtual keyboard, input selecting one search result from the set of search results; and
providing, utilizing the virtual sign language system, an output corresponding to the selected one search result.

2. The method of claim 1, wherein the sign language element inputs comprises inputs identifying at least one of: a parameter and a phonological restriction of the sign language element.

3. The method of claim 2, wherein the parameter of the sign language element comprises a handshape.

4. The method of claim 2, wherein the parameter of the sign language element comprises a location the sign language element is provided with respect to a human body.

5. The method of claim 2, wherein the parameter of the sign language element comprises a movement when the sign language element is performed.

6. The method of claim 2, wherein the phonological restriction of the sign language element is a handed-type.

7. The method of claim 1, comprising displaying the virtual keyboard, wherein the virtual keyboard comprises a plurality of sign language element input areas, each of the plurality of sign language element input areas corresponding to a parameter or a phonological restriction of the sign language element.

8. The method of claim 1, wherein the determining comprises displaying a plurality of search results that correspond to the received sign language element inputs.

9. The method of claim 1, wherein the output comprises a video of the selected one search result.

10. The method of claim 1, wherein the output comprises a textual form of the selected one search result.

11. A system, the system comprising:
a virtual keyboard;
a processor;
a memory device that stores instructions that when executed by the processor, causes the system to:

receive, utilizing a virtual sign language system, sign language element inputs from a user provided on the virtual keyboard, wherein to receive comprises updating the virtual keyboard based upon the sign language elements inputs received from the user;

determine, utilizing the virtual sign language system, a set of sign language element search results resulting from the sign language element inputs;

receive, from the user at the virtual keyboard, input selecting one search result from the set of search results; and provide, utilizing the virtual sign language system, an output corresponding to the selected one search result.

12. The system of claim 11, wherein the sign language element inputs comprises input identifying at least one of: a parameter and a phonological restriction of the sign language element.

13. The system of claim 12, wherein the parameter of the sign language element comprises a handshape.

14. The system of claim 12, wherein the parameter of the sign language element comprises a location the sign language element is provided with respect to a human body.

15. The system of claim 12, wherein the parameter of the sign language element comprises a movement when the sign language element is performed.

16. The system of claim 12, wherein the phonological restriction of the sign language element is handed-type.

17. The system of claim 11, comprising displaying the virtual keyboard, wherein the virtual keyboard comprises a plurality of sign language element input areas, each of the plurality of sign language element input areas corresponding to a parameter or a phonological restriction of the sign language element.

18. The system of claim 11, wherein the output comprises a video of the selected one search result.

19. The system of claim 11, wherein the output comprises a textual form of the selected one search result.

20. A product, the product comprising:

a computer-readable storage device that stores executable code that, when executed by the processor, causes the product to:

receive, utilizing a virtual sign language system, sign language element inputs from a user provided on a virtual keyboard, wherein to receive comprises updating the virtual keyboard based upon the sign language elements inputs received from the user;

determine, utilizing the virtual sign language system, a set of sign language element search results resulting from the sign language element inputs;

receive, from the user at the virtual keyboard, input selecting one search result from the set of search results; and provide, utilizing the virtual sign language system, an output corresponding to the selected one search result.

* * * * *